(12) United States Patent  
McCoy et al.

(10) Patent No.: US 9,156,227 B2  
(45) Date of Patent: Oct. 13, 2015

(54) FOAM SEALING GASKET

(75) Inventors: Jessica L. McCoy, Waltham, MA (US); Thomas Adams, Gardner, MA (US); Georges Moineau, Battice (BE)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 557 days.

(21) Appl. No.: 13/179,189

(22) Filed: Jul. 8, 2011

(65) Prior Publication Data

US 2012/0009401 A1 Jan. 12, 2012

Related U.S. Application Data

(60) Provisional application No. 61/362,920, filed on Jul. 9, 2010.

(51) Int. Cl.  
*B32B 7/02* (2006.01)  
*C08J 9/04* (2006.01)  
*B32B 37/14* (2006.01)  
(Continued)

(52) U.S. Cl.  
CPC . *B32B 5/18* (2013.01); *B29C 44/30* (2013.01); *B29C 44/32* (2013.01); *B32B 27/10* (2013.01); *B32B 27/32* (2013.01); *B32B 27/34* (2013.01); *B32B 27/36* (2013.01); *B32B 27/40* (2013.01); *C08F 4/6094* (2013.01); *C08F 4/6095* (2013.01); *C08G 18/6674* (2013.01); *C08J 9/125* (2013.01); *C08J 9/30* (2013.01); *C09K 3/1021* (2013.01); *F16J 15/104* (2013.01); *B29K 2075/00* (2013.01); *B29L 2031/265* (2013.01); *B32B 7/02* (2013.01); *C08G 2101/0008* (2013.01); *C08G 2101/0058* (2013.01); *C08G 2101/0083* (2013.01); *C08G 2190/00* (2013.01); *C08J 2375/04* (2013.01);  
(Continued)

(58) Field of Classification Search  
CPC ............... Y10T 428/24496; Y10T 428/24512  
USPC ............ 428/304.4, 308.4, 220, 314.2–315.9, 428/318.6–318.8, 319.3–319.7, 423.1; 521/155–177, 129–130  
See application file for complete search history.

(56) References Cited

U.S. PATENT DOCUMENTS 4,957,672 A 9/1990 Carter et al.  
5,567,740 A 10/1996 Free  
(Continued)

FOREIGN PATENT DOCUMENTS

EP 1564451 A2 8/2005  
JP 2001100216 A * 4/2001 ............ G02F 1/1339  
(Continued)

OTHER PUBLICATIONS

Machine Translation of JP2001-100216. Retrieved Oct. 30, 2013.*  
(Continued)

*Primary Examiner* — Prashant J Khatri  
(74) *Attorney, Agent, or Firm* — Abel Law Group, LLP; Chi Suk Kim

(57) ABSTRACT

A sealing gasket includes a liner and a polyurethane foam layer disposed on the liner. The polyurethane foam layer can have a density of 50 kg/m³ to 250 kg/m³, a force-to-compress at 25% compression of not greater than 5.0 psi, and an 50% springback parameter of not greater than 2.0 seconds. The polyurethane foam has a thickness in a range of 0.3 mm to 10.0 mm. A surface of the polyurethane foam layer has a skin.

20 Claims, 4 Drawing Sheets

(51) Int. Cl.

| | |
|---|---|
| *B32B 3/26* | (2006.01) |
| *B32B 5/20* | (2006.01) |
| *C08G 18/32* | (2006.01) |
| *B32B 3/00* | (2006.01) |
| *B32B 5/18* | (2006.01) |
| *C08F 4/609* | (2006.01) |
| *B32B 27/10* | (2006.01) |
| *B32B 27/32* | (2006.01) |
| *B32B 27/34* | (2006.01) |
| *B32B 27/36* | (2006.01) |
| *B32B 27/40* | (2006.01) |
| *C08G 18/66* | (2006.01) |
| *C08J 9/12* | (2006.01) |
| *C08J 9/30* | (2006.01) |
| *C09K 3/10* | (2006.01) |
| *F16J 15/10* | (2006.01) |
| *B29C 44/30* | (2006.01) |
| *B29C 44/32* | (2006.01) |
| *C08G 101/00* | (2006.01) |
| *B29L 31/26* | (2006.01) |
| *B29K 75/00* | (2006.01) |

(52) U.S. Cl.
CPC ... *Y10T 156/1084* (2015.01); *Y10T 428/24967* (2015.01); *Y10T 428/249953* (2015.04)

(56) References Cited

U.S. PATENT DOCUMENTS

| | | | |
|---|---|---|---|
| 7,338,983 | B2 | 3/2008 | Simpson et al. |
| 2003/0144372 | A1* | 7/2003 | Kometani et al. ............... 521/99 |
| 2005/0248102 | A1 | 11/2005 | Sato |
| 2006/0213608 | A1 | 9/2006 | Moineau et al. |
| 2007/0197760 | A1 | 8/2007 | Kometani et al. |
| 2009/0092647 | A1 | 4/2009 | Schoenberger et al. |
| 2009/0266729 | A1 | 10/2009 | Alcouloumre et al. |

FOREIGN PATENT DOCUMENTS

| | | | |
|---|---|---|---|
| JP | 2008006592 A | * | 1/2008 |
| KR | 20050080733 A | | 8/2005 |

OTHER PUBLICATIONS

"Gasketing Foams". Saint-Gobain Performance Plastics, (2008).*
Norseal Product Sheets: V310, V370, V770 & V820. Saint-Gobain Performance Plastics, (2002-2010).*
Machine Translation of JP2008-006592. Retrieved Jun. 3, 2014.*
International Search Report from PCT/US2011/043390 dated Mar. 6, 2012, 1 pg.

* cited by examiner

FOAM SEALING GASKET

CROSS REFERENCE TO RELATED APPLICATION(S)

The present application claims priority from U.S. Provisional Patent Application No. 61/362,920, filed Jul. 9, 2010, entitled "Foam Sealing Gasket," naming inventors Jessica McCoy, Thomas Adams, and Georges Moineau, which application is incorporated by reference herein in its entirety.

FIELD OF THE DISCLOSURE

This disclosure in general relates to polyurethane foam products and in particular to sealing gaskets.

BACKGROUND

Demand for electronic products has been increasing at an ever accelerating rate. In particular, demand for mobile electronic devices, such as telephones, game consoles, music players, laptop computers, and tablet computers, are becoming more prevalent in society than ever before. Such electronic devices and in particular, such mobile electronic devices can be damaged easily when exposed to environmental conditions, particularly humidity or moisture.

Typical electronic devices are housed within a casing formed in several sections that fit together and are secured by screws or by compression fittings. Such casings generally utilize gaskets to at least partially isolate the inside of the casing from the external environment.

In the mobile electronic devices industry, there is increasing pressure to reduce the weight and cost associated with devices. Oftentimes, the industry turns to lighter materials, such as plastics for the casings and seeks to use lighter materials for the gaskets and other components. However, thin-walled plastic casings can exhibit some degree of flexibility, placing additional strain on gaskets. Conventional gaskets that have poor response to repeated compression can fail to reform a seal between the casing portions after stress in adequate time to prevent dust and particulate from entering the device. Accumulation of dust and particulate can ultimately lead to degradation of device components and failure of the device.

As such, improved sealing gaskets would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In a particular embodiment, a sealing gasket is formed of a polyurethane foam layer. Prior to deployment, the sealing gasket can include a release liner attached to a surface of the polyurethane foam layer. In an example, the polyurethane foam layer has a density of not greater than 250 kg/m$^3$. Further, the polyurethane foam layer exhibits a desirable springback property expressed in turns of a springback parameter based on a percent compression. For example, the polyurethane foam of the sealing gasket can exhibit an 80% springback parameter in a range of 0.005 second to 1.0 seconds, a 50% springback parameter of not greater than 2.0 seconds, or a 20% springback parameter of not greater than 0.002 seconds. In a particular example, the polyurethane foam layer has a thickness in a range of 0.1 mm to 5 mm. The polyurethane foam layer can also include surfaces that exhibit desirable tack.

In an exemplary embodiment, a method of making a sealing gasket includes preparing a mixture of an isocyanate component, a polyol component, chain extenders or crosslinking agents, blowing agents, and a catalyst. The mixture is placed on a moving carrier and passed through an oven. Optionally, an upper film can be applied over the mixture as it passes into the oven. One of the carrier or the upper film can include or can form a release liner that remains with the cured foam layer when it is rolled into a roll.

Figure 1:
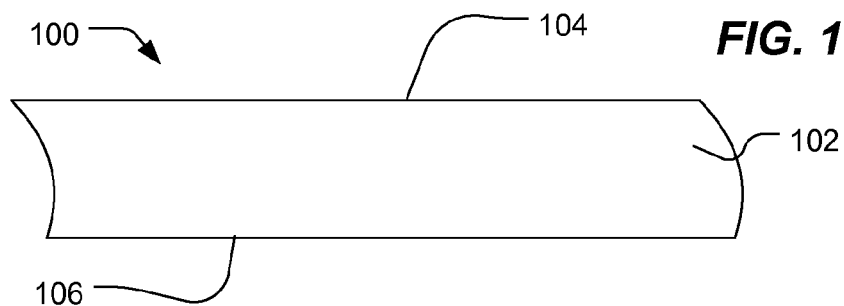
FIG. 1, FIG. 2, and FIG. 3 include illustrations of exemplary gasket configurations.

As illustrated in FIG. 1, a gasket 100 includes a foam layer 102 having a top surface 104 and a bottom surface 106. The foam layer 102 can be a polyurethane foam formed from a reaction between an isocyanate component, a polyol component, a catalyst, an optional blowing agent, an optional surfactant, and an optional chain extender or crosslinking agent.

The isocyanate component can include one or more isocyanates. An exemplary isocyanate can include toluene diisocyanate, m-phenylene diisocyanate, p-phenylene diisocyanate, xylene diisocyanate, 4,4'-diphenylmethane diisocyanate, hexamethylene diisocyanate, isophorone diisocyanate, polymethylene polyphenyl diisocyanate, 3,3'-dimethyl-4,4'-biphenylene diisocyanate, 3,3'-dimethyl-4,4'-diphenylmethane diisocyanate, 3,3'-dichloro-4,4'-biphenylene diisocyanate, or 1,5-naphthalene diisocyanate; their modified products, for instance, carbodiimide-modified products; or the like, or any combination thereof. Such isocyanate monomers can be used alone or in admixture of at least two kinds. In a particular example, the isocyanate component can include methylene diphenyl diisocyanate (MDI), toluene diisocyanate (TDI), hexamethylene diisocyanate (HDI), isophorone diisocyanate (IPDI), or any combination thereof. In an example, the isocyanate can include methylene diphenyl diisocyanate (MDI) or toluene diisocyanate (TDI). In particular, the isocyanate includes methylene diphenyl diisocyanate (MDI) or derivatives thereof.

In another example, the isocyanate component includes an oligomeric isocyanate. For example, the oligomeric isocyanate can include a backbone of the aliphatic or aromatic polyester, such as a backbone derived from aliphatic glycols, e.g., diethylene glycol, or from aliphatic or aromatic acids; or of the polyether type, especially polyethylene oxide or polypropylene oxide or polytetrahydrofuran, or any combination thereof.

The isocyanate component can have an average functionality in a range of 2.0 to 3.0, such as a range of 2.0 to 2.9, or even a range of 2.0 and 2.7. Further, the isocyanate component can have an NCO content in the range of 5% to 35%, such as the range of 10% to 30%.

In a particular embodiment, the isocyanate component can be a modified polymeric methylene diphenyl isocyanate (MDI). In a further example, an isocyanate component can include a mixture of isocyanates, such as a mixture of modified methylene diphenyl isocyanates.

In an example, the polyol can be a polyether polyol, a polyester polyol, derivatives of fatty acid dimers, modified or grafted derivatives thereof, or any combination thereof. A suitable polyether polyol can be produced by polyinsertion via double metal cyanide catalysis of alkylene oxides, by anionic polymerization of alkylene oxides in the presence of alkali hydroxides or alkali alcoholates as catalysts and with the addition of at least one initiator molecule containing 2 to 6, preferably 2 to 4, reactive hydrogen atoms in bonded form, or by cationic polymerization of alkylene oxides in the presence of Lewis acids, such as antimony pentachloride or boron fluoride etherate. A suitable alkylene oxide can contain 2 to 4 carbon atoms in the alkylene radical. An example includes tetrahydrofuran, 1,2-propylene oxide, 1,2- or 2,3-butylene oxide; ethylene oxide, 1,2-propylene oxide, or any combination thereof. The alkylene oxides can be used individually, in succession, or as a mixture. An example of an initiator molecule includes water or dihydric or trihydric alcohols, such as ethylene glycol, 1,2-propanediol and 1,3-propanediol, diethylene glycol, dipropylene glycol, ethane-1,4-diol, glycerol, trimethylol propane, or any combination thereof.

In another example, the polyol can include a polyester polyol. In an exemplary embodiment, a polyester polyol is derived from dibasic acids such as adipic, glutaric, fumaric, succinic or maleic acid, or anhydrides and di-functional alcohols, such as ethylene glycol, diethylene glycol, propylene glycol, di or tripropylene glycol, 1-4 butane diol, 1-6 hexane diol, or any combination thereof. For example, the polyester polyol can be formed by the condensation reaction of a glycol and an acid with the continuous removal of the water by-product. A small amount of high functional alcohol, such as glycerin, trimethanol propane, pentaerythritol, sucrose or sorbitol or polysaccharides can be used to increase branching of the polyester polyol. The esters of simple alcohol and the acid can be used via an ester interchange reaction where the simple alcohols are removed continuously like the water and replaced by one or more of the glycols above. Additionally, polyester polyols can be produced from aromatic acids, such as terephthalic acid, phthalic acid, 1,3,5-benzoic acid, their anhydrides, such as phthalic anhydride. In a particular example, the polyol can include an alkyl diol alkyl ester. For example, the alkyl diol alkyl ester can include trimethyl pentanediol isobutyrate, such as 2,2,4-trimethyl-1,3-pentanediol isobutyrate. In another example, the polyol can be derived from a fatty acid dimer, such as a $C_{20-44}$ fatty chain.

In a particular embodiment, the polyol can be a multifunctional polyol having at least two primary hydroxyl groups. For example, the polyol can have at least three primary hydroxyl groups. In a particular example, the polyol is a polyether polyol having an OH number in the range of 5 mg KOH/g to 70 mg KOH/g, such as a range of 10 mg KOH/g to 70 mg KOH/g, a range of 10 mg KOH/g to 50 mg KOH/g, or even 15 mg KOH/g to 40 mg KOH/g. In a further example, the polyether polyol can be grafted. For example, the polyol can be a polyether polyol grafted with styrene-acrylonitrile. In a further example, the polyol can include a blend of multifunctional, such as trifunctional polyether polyols, and polyols that are grafted, such as a polyether polyol having a grafted styrene-acrylonitrile moiety. In a particular example, the polyol is a polyether polyol, available under the trade name Lupranol® available from Elastogran by BASF Group. In another example, the polyol is an ethylene oxide modified polypropylene triol.

Exemplary polyols can have average functionalities of 1.5 to 4, such as 2 to 3. In another example, the polyol can have number-average molecular weights of 800 g/mol to 25,000 g/mol, such as 800 g/mol to 14,000 g/mol, 2,000 g/mol to 9,000 g/mol, 3000 g/mol to 8000 g/mol, or even 5000 g/mol to 8000 g/mol.

The reactive composition can also include chain extenders or crosslinking agents. Exemplary chain extenders can include difunctional polyols, such as ethylene glycol, diethylene glycol, triethylene glycol, propylene glycol, dipropylene glycol, 1,3 propanediol, 1,3 butanediol, 1,4 butanediol, neopentyl glycol, 1,6-hexanediol, 1,4-cyclohexanedimethanol, ethanolamine, diethanolamine, methyldiethanolamine, phenyldiethanolamine. Other agents can include glycerol, trimethylolpropane, 1,2,6-hexanetriol, triethanolamine, pentaerythritol, N,N,N',N'-tetrakis(2-hydroxypropyl)ethylenediamine, diethyltoluenediamine, dimethylthiotoluenediamine, or any combination thereof.

The catalyst can include an organometallic catalyst, an amine catalyst, or a combination thereof. In particular, the catalyst provides delayed curing and blowing. An organometallic catalyst, for example, can include dibutyl tin dilaurate, a lithium carboxylate, tetrabutyl titanate, a bismuth carboxylate, a metal acetyl acetonate or any combination thereof.

The amine catalyst can include a tertiary amine, such as tributylamine, N-methyl morpholine, N-ethyl morpholine, N,N,N',N'-tetramethyl ethylene diamine, pentamethyl diethylene triamine and higher homologues, 1,4-diazobicyclo-[2,2,2]-octane, 1,8-diazobicyclo[5.4.0]undecene-7, 1,5-diazobicyclo[5.4.0]undec-5-ene, N-methyl-N'-dimethylaminoethyl piperazine, bis(dimethylaminoalkyl) piperazine, N,N-dimethyl benzylamine, N,N-dimethyl cyclohexylamine, N,N-diethyl benzylamine, bis(N,N-diethylaminoethyl)adipate, N,N,N',N'-tetramethyl-1,3-butane diamine, N,N-dimethyl-β-phenyl ethylamine, bis(dimethylaminopropyl)urea, bis(dimethylaminopropyl)amine, 1,2-dimethyl imidazole, 2-methyl imidazole, monocyclic and bicyclic amidine, bis(dialkylamino)alkyl ether, such as e.g., bis(dimethylaminoethyl)ethers, tertiary amines having amide groups (such as formamide groups), or any combination thereof. Another example of a catalyst component includes Mannich bases including secondary amines, such as dimethylamine, or aldehyde, such as formaldehyde, or ketone such as acetone, methyl ethyl ketone or cyclohexanone or phenol, such as phenol, nonyl phenol or bisphenol. A catalyst in the form of a tertiary amine having hydrogen atoms that are active with respect to isocyanate groups can include triethanolamine, triisopropanolamine, N-methyldiethanolamine, N-ethyl diethanolamine, N,N-dimethyl ethanolamine, reaction products thereof with alkylene oxides such as propylene oxide or ethylene oxide, or secondary-tertiary amines, or any combination thereof. Silamines with carbon-silicon bonds can also be used as catalysts, for example, 2,2,4-trimethyl-2-silamorpholine, 1,3-diethyl aminomethyl tetramethyl disiloxane, or any combination thereof.

In a further example, the amine catalyst is selected from a pentamethyl diethylene triamine, dimethylaminopropylamine, N,N' dimethylpiperazine and dimorpholinoethylether, N,N' dimethyl aminoethyl N-methyl piperazine, JEFFCAT®DM-70 (a mixture of N,N' dimethylpiperazine and dimorpholinoethylether), imadozoles, triazines, or any combination thereof.

In a particular example, the catalyst can include a tertiary amine catalyst and a dicarboxylic acid. The tertiary amine can include N,N,N',N'-tetramethylethylenediamine, N,N,N',N'-tetramethylpropylenediamine, N,N,N',N'',N''-pentamethyldiethylenetriamine, N,N,N',N'',N''-pentamethyl(3-aminopropyl)ethylenediamine, N,N,N',N'',N''-pentamethyldipropylenetriamine, N,N,N',N'-tetramethylguanidine, 1,8-diazobicyclo[5.4.0]undecene-7,1, 5-diazobicyclo[5.4.0]undec-5-ene, triethylenediamine, N,N,N',N'-tetramethylhexamethylenediamine, N-methyl-N'-(2-dimethylaminoethyl)piperazine, N,N'-dimethylpiperazine, dimethylcyclohexylamine, N-methylmorpholine, N-ethylmorpholine, bis(2-dimethylaminoethyl)ether, 1-methylimidazole, 1,2-dimethylimidazole, 1-isobutyl-2-methylimidazole, 1-dimethylaminopropylimidazole or any combination thereof. In particular, the catalyst is a heterocyclic tertiary amine, for example, an amidine class catalyst, e.g., including a pyrimidoazepine, such as diazobicycloundecene.

The dicarboxylic acid can including succinic acid, glutaric acid, adipic acid, pimelic acid, suberic acid, azelaic acid, sebacic acid, undecanedioic acid, decane-dicarboxylic acid, 1,11-undecane-dicarboxylic acid, 1,12-dodecane-dicarboxylic acid, hexadecanedioic acid, or any combination thereof. In another example, the dicarboxylic acid can be an aromatic dicarboxylic acid, such as benzene dicarboxylic acid.

The catalyst can be included in an amount of 0.1 wt % to 2.0 wt % based on the total weight of the froth, such as a range of 0.2 wt % to 1.8 wt %, a range of 0.2 wt % to 1.5 wt %, or even a range of 0.2 wt % to 1.0 wt %. In particular, the catalyst can be used in a range of 0.2 parts per hundred parts polyol (pphp) to 1.0 pphp, such as 0.2 pphp to 0.8 pphp, 0.2 pphp to 0.6 pphp, or even 0.3 pphp to 0.5 pphp.

Optionally, the composition can include a surfactant or other additives. For example, the composition can include a foam stabilizing surfactant, such as a silicone surfactant. An exemplary surfactant includes a multi-block copolymer of polydimethylsiloxane (PDMS) and a polyether, a PDMS grafted with polyether chains, or any combination thereof. Optionally, the surfactant can include hydroxyl groups that can react with the isocyanate component. The composition can also include one or more other additives, such as dyes or pigments, fillers, thixotropic agents, flame retarders, antioxidants, fungicides or biocides, or any combination thereof.

To form the foam, a mixture of the precursors can be frothed. In addition, a blowing agent, such as a chemical blowing agent or a physical blowing agent can be used. In an example, the mixture can be frothed in the presence of a gas, such as air, nitrogen, or a noble gas including, for example, helium, neon, or argon.

An exemplary chemical blowing agent can be water. Water can be used in an amount of 0.1 wt % to 5 wt. % of the total reactive composition. In a particular example, water can be used in a range of 0.1 pphp to 2.0 pphp, such as a range of 0.1 pphp to 1.0 pphp, a range of 0.1 pphp to 0.5 pphp, or even a range of 0.2 pphp to 0.5 pphp. Other chemical blowing agents can be used, such as azo compounds, for example, azoisobutyronitrile, azodicarbonamide (i.e. azo-bis-formamide) and barium azodicarboxylate; substituted hydrazines, for example, diphenylsulfone-3,3'-disulfohydrazide, 4,4'-hydroxy-bis-(benzenesulfohydrazide), trihydrazinotriazine or aryl-bis-(sulfohydrazide); semicarbazides, for example, p-tolylene sulfonyl semicarbazide or 4,4'-hydroxy-bis-(benzenesulfonyl semicarbazide); triazoles, for example, 5-morpholyl-1,2,3,4-thiatriazole; and N-nitroso compounds, for example, N,N'-dinitrosopentamethylene tetramine or N,N-dimethyl-N,N'-dinitrosophthalmide; benzoxazines, for example, isatoic anhydride; or mixtures such as, for example, sodium carbonate/citric acid mixtures, or any combination thereof. Such blowing agents can be used in an amount of 0.1 wt % to 10 wt. % of the total reactive composition.

Physical blowing agents can be used, alone or as mixtures with each other or with one or more chemical blowing agents. Physical blowing agents can be selected from a broad range of materials, including hydrocarbons, ethers, esters and partially halogenated hydrocarbons, ethers and esters, or the like. Typical physical blowing agents have a boiling point between −50° C. and 100° C., and preferably between about −50° C. and 50° C. Exemplary physical blowing agents include the CFC's (chlorofluorocarbons) such as 1,1-dichloro-1-fluoroethane, 1,1-dichloro-2,2,2-trifluoro-ethane, monochlorodifluoromethane, and 1-chloro-1,1-difluoroethane; the FC's (fluorocarbons) such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the fluoroethers such as methyl-1,1,1-trifluoroethylether and difluoromethyl-1,1,1-trifluoroethylether; hydrocarbons such as n-pentane, isopentane, and cyclopentane; methylene chloride; or any combination thereof. Such physical blowing agents can be used in an amount of 5% to 50% by weight of the reactive composition, typically 10% to 30% by weight of the reactive composition. In one embodiment, water is used as the blowing agent along with one or more physical blowing agents. Alternatively, water is used as a blowing agent in a frothed reactive composition and the reactive composition is free of a physical blowing agent.

Returning to FIG. 1, the foam layer 102 has a top surface 104 and a bottom surface 106 that are characterized by a skin. The skin, for example, is substantially free of pores. For example, the skin associated with the top layer 104 and the bottom layer 106 can be substantially continuous including few, if any, breaks or openings.

Figure 2:
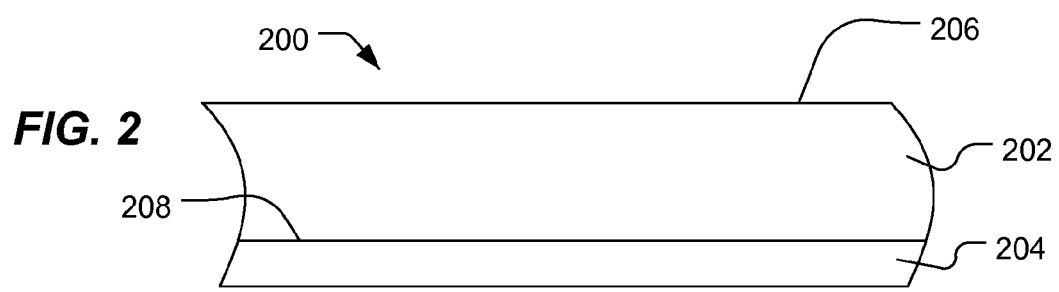

The gasket can also include one or more release liners or permanent film layers disposed over the surfaces 104 and 106. For example as illustrated in FIG. 2, a gasket 200 includes a foam layer 202 and a liner 204. The foam layer 202 includes a top surface 206 that is free of a liner and a bottom surface 208 attached to the liner 204. The liner 204 can be permanently attached. Alternatively, the liner 204 is a release liner configured to be removed prior to deployment of the foam layer 204.

Figure 3:
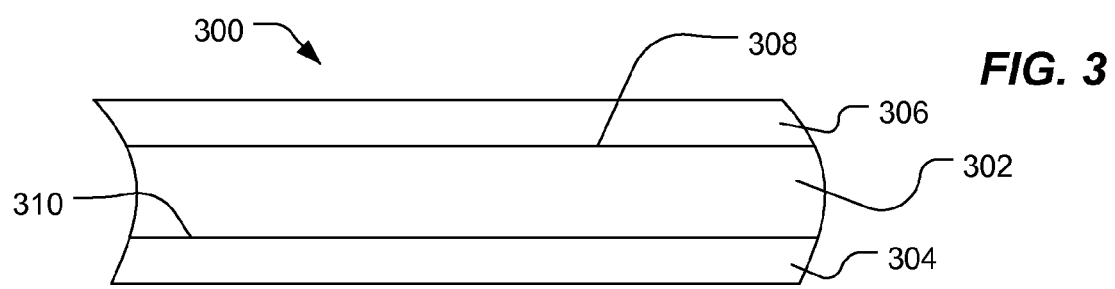

In a further example, the gasket can include two liners, one or both being release liners or one or both being permanent liners. For example, as illustrated in FIG. 3, a gasket 300 includes a foam layer 302, a liner 304 disposed on a bottom surface 310 of the foam layer 302, and a liner 306 disposed on a top surface 308 of the foam layer 302. In an example, both liners 304 and 306 are permanent. In another example, the liner 306 can be a release liner, removable from the foam layer 302, whereas a liner 304 can be a permanent liner. In a further example, both liners 304 and 306 are release liners, removable from the foam layer 302.

An exemplary liner includes paper, a polymer film, or any combination thereof. An exemplary paper includes a coated paper. An exemplary polymer film is formed of polyolefin, polyester, polyamide, polyvinyl chloride, fluoropolymer, polyimide, or any combination thereof. An exemplary polyolefin includes polyethylene, polypropylene, or any combination thereof. An exemplary polyester includes poly(ethylene terephthalate) (PET). In another example, the polymer film is formed of a liquid crystal polymer, such as an aromatic polyester or a polyesteramide.

In an example, the liner has a thickness in a range of 12 microns to 200 microns. For example, the liner can have a thickness in a range of 25 microns to 180 microns, such as a range of 25 microns to 150 microns, or even a range of 25 microns to 100 microns. Further, the liner can have a base weight in a range of 10 g/m$^2$ to 400 g/m$^2$, such as a range of 30 g/m$^2$ to 350 g/m$^2$, or even a range of 40 g/m$^2$ to 300 g/m$^2$.

In a particular example, the surfaces of the foam layer in contact with the release liner exhibits a desirable range of adhesion to a release liner (PET film) as determined by the method described in the Examples. For example, the surface of the foam layer in contact with the release liner (PET) can exhibit an adhesion of approximately 0.01 N/in or lower. Alternatively, the surface can have an initial adhesion in a range of 0.01 N/in to 0.2 N/in, a range of 0.015 N/in to 0.2 N/in, or even a range of 0.02 N/in to 0.2 N/in.

Upon removal of the release liner or separation from the release liner, a surface of the foam layer can exhibit a desirable tack. Tack is measured in accordance with the method described in the Examples. For example, the tack can be at least 0.1 N, such as at least 0.2 N, for example, in a range of 0.2 N to 1.2 N, such as a range of 0.3 N to 1.2 N or 0.3 N to 1.0 N.

In particular, the foam layer is formed of a polyurethane foam having desirable properties such as density, a springback, force-to-compress (FTC), compression force deflection (CFD), or compression set. Polyurethane foams, particularly those formed as described in the method below, exhibit properties that are particularly suited for use in sealing gaskets.

In an example, the foam layer has a density of not greater than 350 kg/m$^3$ as measured in accordance with ASTM D3574. For example, the density can be not greater than 250 kg/m$^3$. In an example, the density of the foam layer is in a range of 50 kg/m$^3$ to 250 kg/m$^3$, such as a range of 60 kg/m$^3$ to 250 kg/m$^3$, a range of 100 kg/m$^3$ to 250 kg/m$^3$, a range of 100 kg/m$^3$ to 200 kg/m$^3$, or even a range of 125 kg/m$^3$ to 200 kg/m$^3$.

In addition, the foam layer exhibits a desirable compression profile. For example, the foam layer can exhibit a desirable instant force-to-compress (FTC) at 25% compression as measured according to ASTM D3574 Test C, of not greater than 5.0 psi, such as not greater than 3.0 psi, not greater than 2.0 psi, not greater than 1.7 psi, or even not greater than 1.5 psi. In an example, the FTC is at least 0.2 psi, such as at least 0.5 psi. Further, the foam layer can exhibit a compression force deflection (CFD), as measured in accordance with ASTM D3574 Test C at 25% compression in a range of not greater than 3.0 psi, such as not greater than 2.0 psi, not greater than 1.5 psi, not greater than 1.25 psi, or even not greater than 1.0 psi. In an example, the CFD is at least 0.1 psi, such as at least 0.2 psi. In particular, the foam layer exhibits a lower stress versus compression curve.

The foam layer can also exhibit a desirable compression set measured in accordance with ASTM D3574 at 70° C. for 22 hours and 50% compression of not greater than 15%, such as not greater than 12%, or even not greater than 10%. The foam layer can exhibit a compression set measured in accordance with ASTM D3574 at 23° C. for 22 hours at 50% compression of not greater than 10%, such as not greater than 7.0%, not greater than 5.5%, or even not greater than 5.0%.

A unique property exhibited by the foam layer, particularly those formed as described below, is springback. The springback parameter is the time it takes for a foam to exert 1.5 N force following release from compression according to the method defined in the Examples. For example, the foam can exhibit an 80% springback parameter in a range of 0.000 seconds to 5 seconds, such as a range of 0.000 seconds to 2 seconds, a range of 0.000 seconds to 1 second, a range of 0.005 seconds to 1 second, 0.005 seconds to 0.1 seconds, or even a range of 0.005 seconds to 0.05 seconds. Further, the foam layer can exhibit a desirable 50% springback parameter of not greater than 2 seconds, such as not greater than 1.5 not greater than 1 second, not greater than 0.1 seconds, not greater than 0.01 seconds, or even not greater than 0.001 seconds. In a further example, the film layer can exhibit a 20% springback parameter of not greater than 0.002 seconds, such as not greater than 0.0015, or not greater than 0.001 seconds.

When formed as a sealing device or gasket, the film layer can have a thickness in a range of 0.1 mm to 10 mm. For example, the foam layer can have a thickness in a range of 0.1 mm to 5 mm, such as a range of 0.2 mm to 4 mm, a range of 0.3 mm to 3.0 mm, or even a range of 0.5 mm to 1.0 mm.

In a particular example, the sealing gasket is formed by applying a mixture of precursors to a moving carrier for a curing oven. The resulting film is rolled for later storage and can be dispensed and cut into a desirable shape to form a sealing gasket. The mixture of precursors can be formed as a two component reactive mixture.

Figure 4:
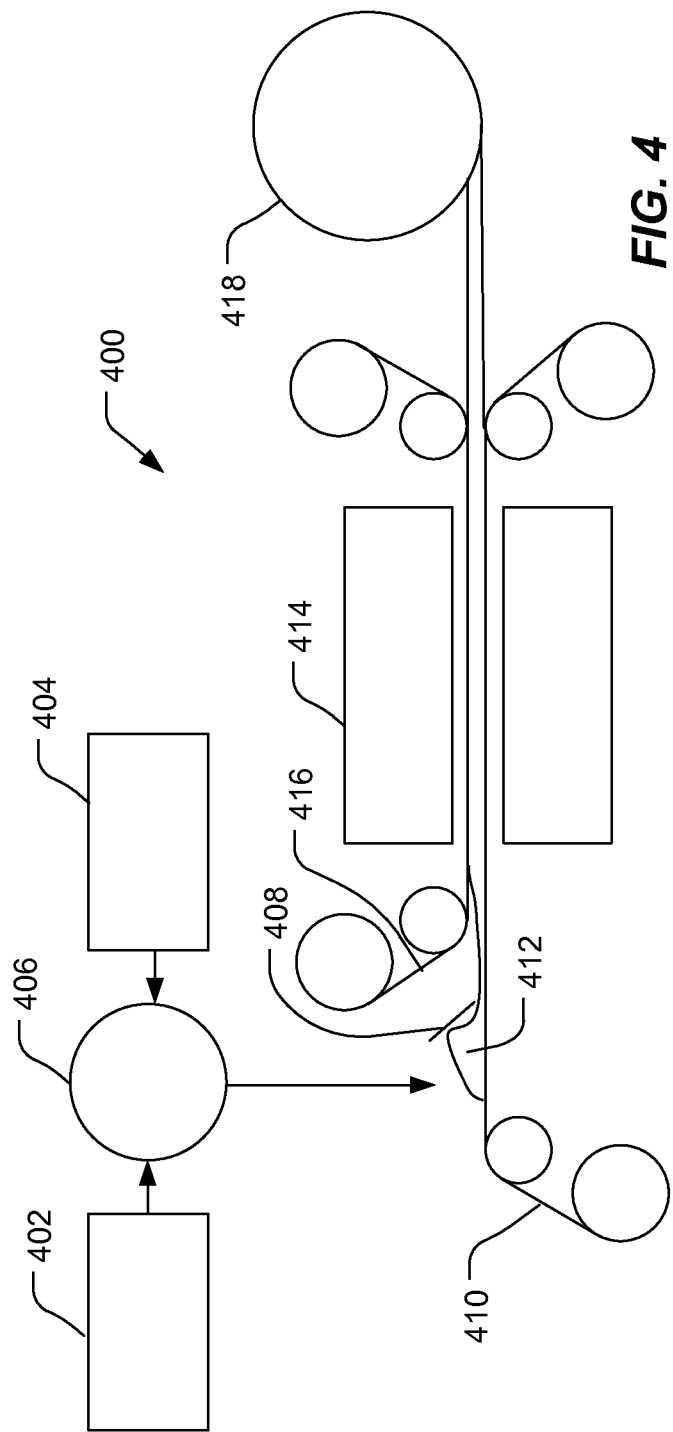
FIG. 4, FIG. 5, and FIG. 6 include illustrations of exemplary systems for forming foam materials useful in making sealing gaskets.

For example, as illustrated in FIG. 4, a first set of components including at least one polyol, with optional surfactants and other additives, such as dyes, pigments or fillers, water, and the catalyst is prepared at 402. A second set of components is prepared at 404, including at least one isocyanate. The first set of components is mixed with the second set of components in a mixer 406. Optionally, the mixture can be frothed to include a gas, such as air, nitrogen, or a noble gas including, for example, helium, neon, or argon.

The mixture is applied as a foam layer 412 to a carrier 410, which, for example, moves the foam layer 412 through an oven 414. The carrier 410 can have a non-stick surface. For example, the carrier 410 can be coated with a release agent, such as a silicone release coating, or can include a non-stick material, such as a fluoropolymer, e.g., Teflon®.

In an example, prior to entering the oven, a film 416 is applied over the foam layer 412. The film 416 can constrain the growth of the foam layer 412 to limit the thickness of the foam layer 412. For example, the film 416 can have a tension applied between rollers, the tension limiting the expansion of the foam layer 412. Alternatively, the film 416 can be free of tension and can allow the foam layer 412 to expand to its full extent.

Optionally, a blade or knife 408 can spread the mixture to form a uniform thickness in the foam layer 412 before it enters the oven 414. Alternatively, front rollers associated with the film 416 can act to control the thickness of the mixture entering the oven 414.

After deposition on the carrier 410 and after the optional film 416 is placed over the foam layer 412, the foam layer 412 enters an oven 414 to further facilitate foaming and crosslinking. The oven can have a temperature in a range of 50° C. to 160° C., such as a range of 50° C. to 120° C., a range of 70° C. to 115° C., or even a range of 100° C. to 115° C.

After at least partially curing within the oven the film 414 can be removed and the carrier 410 can be separated from the foam layer 412. The foam layer can be rolled into a roll 418. Alternatively, one or more of the film 416 or carrier 410 can remain attached to the foam to form a liner such as a release liner.

Figure 5:
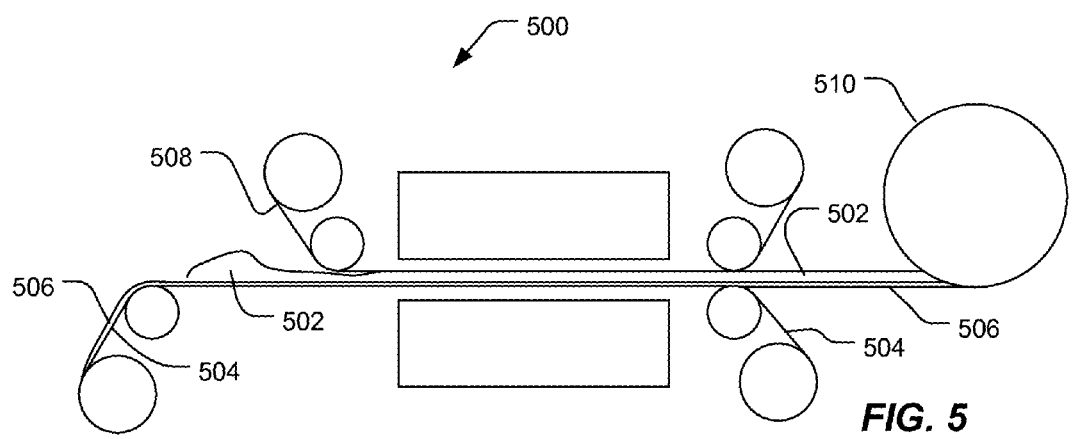

For example, in the system 500 illustrated in FIG. 5, a liner 506 can be applied over the carrier 504. The mixture 502 is applied over the liner 506. A film 508 is applied over the foam mixture 502 as it enters the oven 512. After at least partially curing, the liner 506 is separated from the carrier 504 and rolled with the polyurethane foam into a roll 510. Optionally, a release coating, such as a silicone release coating, can be applied between the carrier 504 and the liner 506 or between the liner 506 and the foam mixture 502. Similarly, the film 508 is separated from the polyurethane foam layer. The resulting construction includes a foam layer and liner. The liner 506 can be a permanent liner or a release liner.

Figure 6:
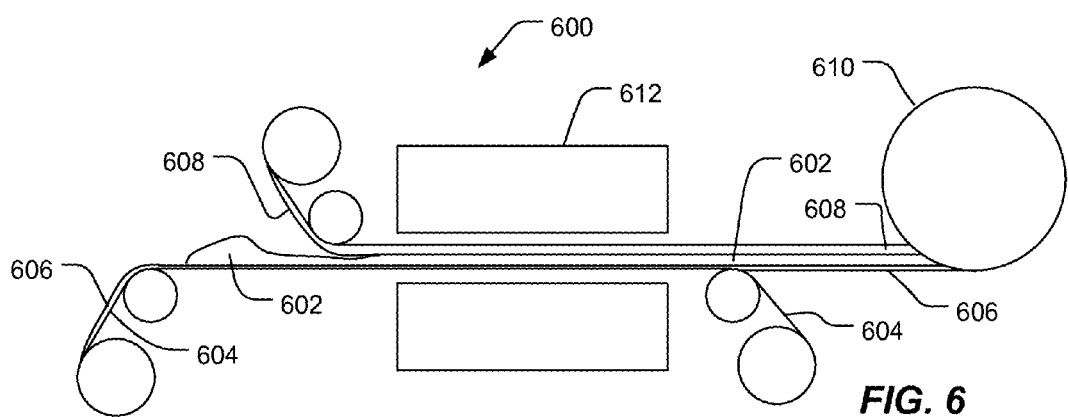

In an alternative embodiment illustrated in FIG. 6, a system 600 includes a carrier 604 onto which a mixture 602 is dispensed. The film 608 is applied over the film mixture as it enters the oven 612. After at least partially curing, the film 608 forms a liner and is rolled with the polyurethane foam into roll 610. Optionally, an additional liner 606 can be applied over the carrier 604. The liner 606 can be incorporated into the film product and rolled into roll 610. As such, liners can be applied to the foam layer as a release film from the support layer, as the film 608 itself, as a liner released from the film 608, as the carrier itself 604, or any combination thereof.

Figure 7:
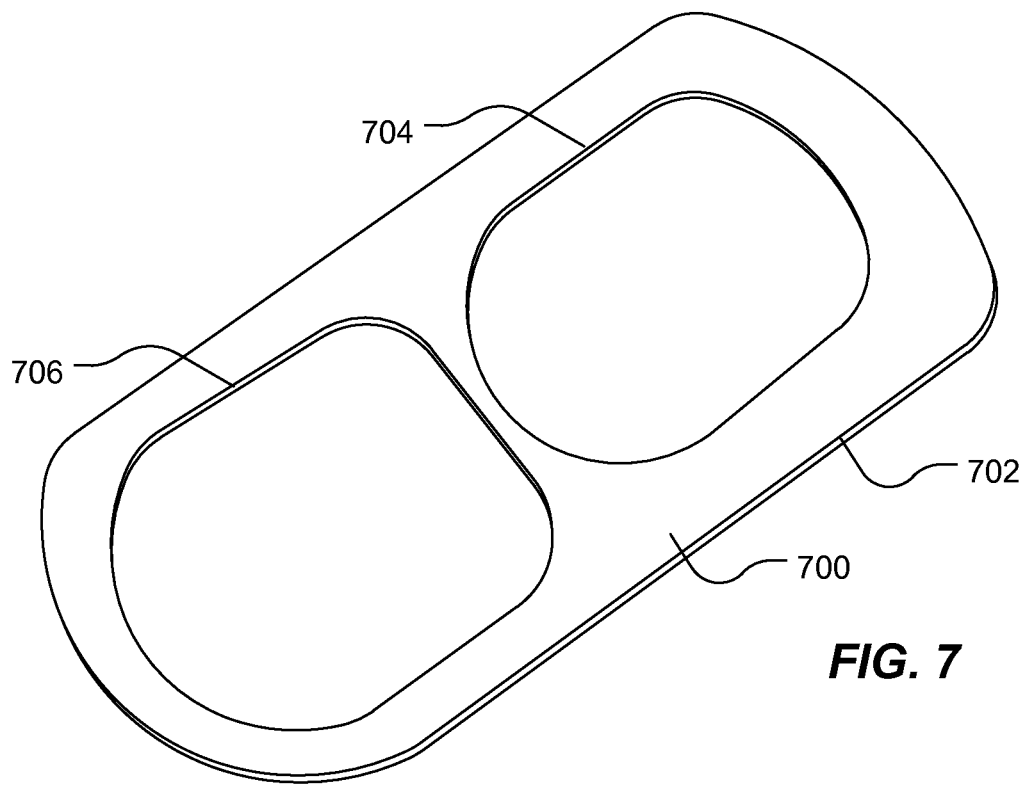
FIG. 7 includes an illustration of an exemplary seal gasket.

In a particular example, the resulting film and optional liner configurations can be dispenses from a roll and cut into shapes to form sealing gaskets. For example, FIG. 7 includes an illustration of an exemplary sealing gasket 700 cut from a film. The layers, including a film layer, can be cut into desirable shapes including outer contours 702 or inner contours 704 and 706. For example, the shape of the sealing gasket can be stamped, die cut, or laser cut from the dispensed film layers.

When used in the moving systems of FIG. 4-6, embodiments of the compositions describe above provide foam products having desirable properties. For example, such compositions when incorporating a delaying catalyst as described above provide desirable density and springback properties when formed using the system of FIGS. 4-6.

EXAMPLES

Springback Parameter

The springback parameter is the time a foam takes to exert a force of 1.5 N after release from 10 seconds of compression. The springback parameter is determined in accordance with the method defined below and is expressed in terms of the percent compression prior to release. For example, the 20% springback parameter is the time a foam takes to exert the desired force following 20% compression.

The method for determining the springback parameter is a) compress a foam layer to a set percent compression (e.g., 20%, 50% or 80%) based on the foam's original thickness at a rate of 0.16 mm/sec using a flat probe having a surface area of 491 mm$^2$, b) hold compression for 10 seconds, c) move the probe to a position corresponding to 85% of the original thickness, d) measure the force exerted by the foam for approximately 30 seconds, and e) release compression. The springback parameter is the amount of time the foam takes to exert 1.5 N on the probe when positioned at 85% of the original thickness.

Tack

Tack is the maximum force measured when separating a tape loop completely from a glass slide. Tackiness is expressed as the average maximum value over several tests.

The test is commenced with an upper tensile grip at a start point of 110 mm above a slide surface. The loop begins its approach towards the slide at 5 mm/s. The loop travels 70 mm to achieve full tape contact across the width of a glass slide. Once the contact is made (25 mm×25 mm contact area), the upper grip is raised, separating the tape loop from the glass slide. The force is measured and the grip returns to its initial starting position.

Adhesion to Liner

Release force from a protective PET film is measured according to FINAT test method No. 9—'Quick-Stick'.

For the top surface, a protective PET film is laminated with the foam top surface and is cut into 1" width strip. The strip is rolled with a 2.5 kg roller back and forth and then allowed to sit for 1 hour before testing. The 90° release force is measured at a peel speed of 40"/min by peeling the protective PET film.

For the bottom surface in contact with a PET support, the foam with support PET liner is cut into 1" wide strip. The 90° release force is measured at a peel speed of 40"/min by peeling the bottom PET liner.

Example 1

A sample is prepared including a PET release liner on a polyurethane foam layer. The sample is prepared using the system illustrated in FIG. 4. The oven temperature includes zones having temperatures in a range of 110° C. to 120° C.

The polyol mixture includes a polyol, a catalyst, a chain extender, water, and a surfactant. The polyol is a polyether polyol having an average molecular weight of 6000. The catalysts is used in an amount of 0.2 to 0.8 pphp and provides a delay time of at least 3 minutes in a cup test at 115° C. at a concentration of 0.4 pphp in the presence of 0.3-0.4 pphp water. The surfactant is a silicone surfactant or a combination of surfactants including a silicone surfactant, present in an amount of 4 to 16 pphp. The blowing agent is water, present in an amount of 0.1 to 0.5 pphp. The chain extender is 1,4 butanediol, present in an amount of 6 pphp to 10 pphp.

The polyol mixture is mixed and then frothed in the presence of an isocyanate. The isocyante is a modified polymeric MDI included in the froth in an amount to provide an index of 0.9 to 1.1. A ratio of froth density to cured foam density is approximately 2.0.

Example 2

The sample is tested in comparison to commercially available products, Poron 4790-92-12030 available from Rogers and K20 available from Saint-Gobain. The sample and products are tested for springback, tack and adhesion to release liners.

TABLE 1

Foam Properties

| Property | | Sample | Poron | K20 |
|---|---|---|---|---|
| Springback (seconds) | 20% | 0.000 | 0.002 | 0.025 |
| | 50% | 0.000 | 2.032 | 2.144 |
| | 80% | 0.014 | 1.0560 | 14.564 |
| Tack (N) | | 0.4 | 0 | 0 |
| Release (N/in) | | 0.025 top; 0.14 bottom | 0 | 0.005 |

The Sample exhibits quick springback relative to commercially available products. In addition, the Sample exhibits desirable tack and desirable adhesion to the protective PET film, whereas the commercially available products exhibit nearly no adhesion or tack.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A sealing gasket comprising a polyurethane foam having a density of not greater than 220 kg/m$^3$ and having an 80% springback parameter in a range of 0.000 seconds to 1 seconds, wherein the polyurethane foam is a reaction product of reaction constituents comprising:
   a polyol;
   an isocyanate; and
   a delaying catalyst, wherein the delaying catalyst comprises an amine and a dicarboxylic acid and the delaying catalyst has a delay time of at least 3 minutes as measured at 115° C. at a concentration of 0.4 pphp in the presence of 0.3-0.4 pphp water.

2. The sealing gasket of claim 1, wherein the 50% springback parameter of not greater than 2.0 seconds.

3. The sealing gasket of claim 1, wherein the 20% springback parameter of not greater than 0.0015 seconds.

4. The sealing gasket of claim 1, wherein a surface of the polyurethane foam has a tack adhesion of at least 0.1 N on glass.

5. The sealing gasket of claim 1, wherein the dicarboxylic acid includes succinic acid, glutaric acid, adipic acid, pimelic acid, suberic acid, azelaic acid, sebacic acid, undecanedioic acid, decane-dicarboxylic acid, 1,11-undecane-dicarboxylic acid, 1,12-dodecane-dicarboxylic acid, hexadecanedioic acid.

6. The sealing gasket of claim 1, wherein the density is in a range of 50 kg/m$^3$ to 200 kg/m$^3$.

7. The sealing gasket of claim 1, wherein the polyurethane foam has a compression set of not greater than 10% at 70° C. for 22 hours and 50% compression.

8. The sealing gasket of claim 1, wherein the polyurethane foam has a compression force deflection determined at 25% compression of not greater than 1.5 psi.

9. The sealing gasket of claim 1, wherein the polyurethane foam has a force-to-compress at 25% compression of not greater than 2.0 psi.

10. The sealing gasket of claim 1, wherein a surface of the polyurethane foam has a tack adhesion when in contact with a PET release liner of at least 0.01 N/in.

11. The sealing gasket of claim 1, wherein the polyurethane foam has a thickness in a range of 0.3 mm to 10.0 mm.

12. The sealing gasket of claim 1, wherein a major surface of the polyurethane foam forms a skin.

13. The sealing gasket of claim 1, further comprising a liner.

14. The sealing gasket of claim 13, wherein the liner is a polymer film.

15. The sealing gasket of claim 13, wherein the liner has a thickness of 12 microns to 200 microns.

16. The sealing gasket of claim 13, wherein the liner has a weight of 10 g/m$^2$ to 400 g/m$^2$.

17. A sealing gasket comprising:
   a liner; and
   a polyurethane foam layer disposed on the liner, the polyurethane foam layer having a density of 50 kg/m$^3$ to 220 kg/m$^3$, a force-to-compress at 25% compression of not greater than 2.0 psi, and an 80% springback parameter in a range of 0.000 seconds to 1 seconds, the polyurethane foam having a thickness in a range of 0.3 mm to 10.0 mm, a surface of the polyurethane foam layer opposite the liner having a skin, wherein the polyurethane foam is a reaction product of reaction constituents comprising:
      a polyol;
      an isocyanate; and
      a delaying catalyst, wherein the delaying catalyst comprises an amine and a dicarboxylic acid and the delaying catalyst has a delay time of at least 3 minutes as measure at 115° C. at a concentration of 0.4 pphp in the presence of 0.3-0.4 pphp water.

18. A method of forming a gasket, the method comprising:
   forming a frothed reactive mixture including an isocyanate component, a polyol component, water, and a delaying catalyst, the delaying catalyst exhibiting a delay before blowing, wherein the catalyst comprises an amine and a dicarboxylic acid and the delaying catalyst has a delay time of at least 3 minutes as measure at 115° C. at a concentration of 0.4 pphp in the presence of 0.3-0.4 pphp water;
   dispensing the frothed reactive mixture on a moving carrier; and
   curing the reactive mixture to form a foam layer, the foam layer having a density of 50 kg/m$^3$ to 250 kg/m$^3$, a force-to-compress at 25% compression of not greater than 2.0 psi, and an 80% springback parameter in a range of 0.000 seconds to 1 seconds, the foam layer having a thickness in a range of 0.3 mm to 10.0 mm, a surface of the foam layer having a skin.

19. The method of claim 18, further comprising applying a film over the reactive mixture deposited on the carrier.

20. The method of claim 18, further comprising cutting the foam layer to form a gasket.

* * * * *